United States Patent Office 3,522,984
Patented Aug. 4, 1970

3,522,984
HIGH-TRANSMISSION LIGHT POLARIZER
Howard G. Rogers, Weston, Mass., assignor to Polaroid Corporation, Cambridge, Mass., a corporation of Delaware
Filed Oct. 23, 1965, Ser. No. 503,015
Int. Cl. G02b 5/30, 27/00
U.S. Cl. 350—157
8 Claims

ABSTRACT OF THE DISCLOSURE

A laminated light polarizing device which transforms unpolarized light into polarized light with negligible loss. A retardation layer with its optic axis at an acute angle to its face is adjacent a lenticulated surface. The lenticulations focus the incident unpolarized light beam into a plurality of pencils. In passing through the retardation layer at an acute angle to its optic axis, each pencil is separated into diverging ordinary and extraordinary components. Subsequent retardation elements and lenticular surface are employed at the exit face to rotate the orthogonal polarizations to a common plane of polarization and recollimate the light.

---

Figure 1:
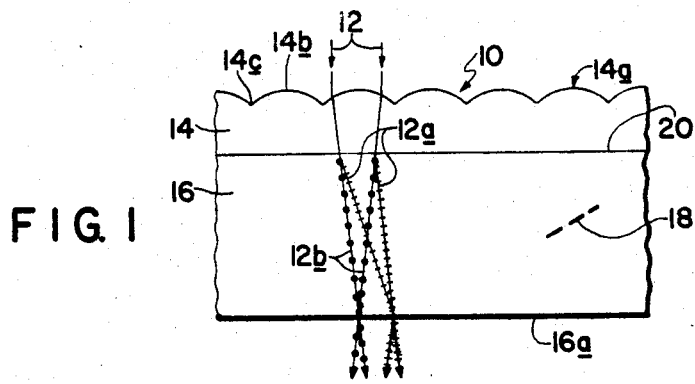

This invention relates to a composite light polarizer which transmits a large proportion of the light incident thereon and which is of a relatively simple structure.

It is characteristic of the usual commercial sheet polarizer, in which a stain or dye is incorporated in a molecularly oriented light transmitting material, or in a material comprising oriented minute crystals, or in a material involving some other type of orientation, that losses through absorption in excess of one-half of the incident light accompany performance of the polarizing function. Such losses are generally undesirable and may prove to be a serious detriment where it is either impractical or impossible to increase the intensity of the light source to balance them.

While light polarizers other than the types above-mentioned and offering improved transmission characteristics have been developed such, for example, as the so-called interference polarizers and those comprising certain arrangements of refracting, doubly-refracting, lenticular, reflecting and retardation components, none of these latter forms has, as far as the evidence goes, been particulaly efficient or found employment on a commercial basis. Thus, for example, in U.S. Pat. No. 2,180,114 there has been disclosed a structure in which a birefringent layer produces, relative to an incident collimated light beam, certain undeviated ray components in the same direction as that of the entering beam and other components which are diffused in various directions. A positive lenticular surface, located next to the birefringent layer, focuses the undeviated components on a plurality of half-wave retardation elements, located in an adjacent layer, to rotate their vibration direction so that it is similar to that of the diffused components. However, certain disadvantages exist in such a system, including the fact that in intentionally changing the vibration directions of the focused components, a portion of the diffused rays is also transmitted by the retardation elements and its polarizing direction is undesirably rotated also. Thus, the nonuniformity of the two components is perpetuated rather than corrected and the operational polarizing efficiency is impaired. Furthermore, there is not complete collimation of the transmitted rays. Again, the structures involve a very small angular aperture so that incident light rays which are not collimated would not be focused on the retardation strips and proper operation would be seriously impaired.

The light polarizing devices of the present invention incorporate lenticular, isotropic, doubly-refracting and retardation elements but distinguish in simplicity of structure and function from those above mentioned and are characterized by a generally improved light polarizing efficiency. The light polarizers described herein are adapted to production methods of manufacture and may be provided on an economical basis in a convenient sheet- or film-like form of reasonably large area. They are believed to have particular utility in systems wherein a high degree of polarized light is required but where a high intensity light source is disadvantageous. Because of their improved transmission properties it is possible, in such instances, to use an accompanying light source of a lower rating than would otherwise be possible. Furthermore, by avoiding the inclusion of a dye or stain, stability is enhanced and there is no possibility of operational impairment through leaching or other dissipation of a dichroic substance. Uses of the type contemplated for the subject light polarizers include anti-glare headlamp systems for vehicles, monoscopic and stereoscopic projection systems, polarized illumination, etc.

Accordingly, an object of the present invention is to provide a novel multilayer light polarizing device of high efficiency and wide utility which converts a large percentage of the incident light to polarized light and transmits it with substantially unreduced intensity.

Other objects are to provide a light polarizer of the character described wherein the layers have given selectively-interrelated refractive properties adapted to operation; to provide a light polarizer of the aforesaid category which may be in the form either of a rigid or a flexible sheet material; to provide such a light polarizer which is adapted to be readily manufactured on an economical basis; to provide a light polarizing device through a novel combination of elements comprising isotropic, doubly-refracting, lenticular, retardation and collimating elements; and to provide a light polarizing material of the character described which is particularly adapted to usage in automotive lighting systems wherein reduction of glare is a desired factor, as well as projection or other illumination systems involving polarized light.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

Figure 2:
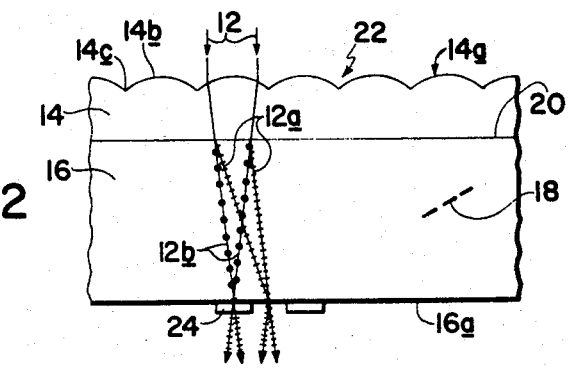
Figure 3:
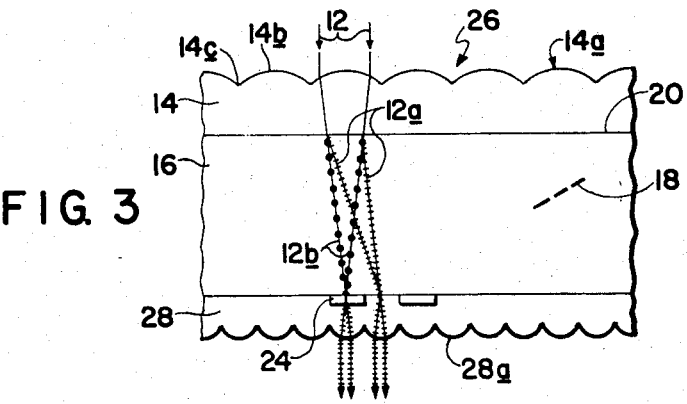

For a fuller understanding of the nature and objects of the invention, reference should be had to the following detailed description taken in connection with the accompanying drawing wherein:

FIG. 1 is a diagrammatic, fragmentary, edge view of a light polarizing sheet material of the present invention illustrating the transmission of light rays therethrough; and FIGS. 2 and 3 are diagrammatic, fragmentary, edge views of modifications of the light polarizing sheet material of the invention.

As hereinbefore intimated, the present invention is primarily concerned with the end problem of providing, in practical and efficient form, what may be termed a high-transmission light polarizer, namely, one which is particularly adapted to polarize a very large portion of incident light, for use in equipment such as may be employed in a polarizing headlamp and viewing-visor system for automobiles, or projection and other illumination purposes. The several structural examples of the light polarizing materials described herein permit a certain degree of latitude as to the nature of the light beams which undergo polarization. Thus, for example, although not limited to use therewith, collimated light beams may be provided by supplementary means or by means incorporated with the light polarizing sheet material itself, as shown in my copending U.S. patent application, Ser. No. 168,398, filed Jan. 24, 1962, now U.S. Pat. No. 3,213,753 to be reissued Dec. 17, 1968 as U.S. Reissue Pat. No. 26,506. The beams are converted to polarized rays of substantially undiminished intensity, any loss of light being essentially limited to a relatively minor amount occurring at the abutting or tangential edges of elongated lenticular elements of the polarizing device. The transmitted polarized light may be in the form of either collimated or non-collimated rays as desired, depending upon structural characteristics of the sheet material, to be described. Again, the transmitted rays may either be linearly polarized and vibrating in a single given azimuth, or vibrating in predeterminedly different directions. When used with a properly-oriented quarter-wave plate (not shown), located in a conventional manner at an exit surface, the emergent rays may be circularly polarized. With these general considerations in mind, the specific structures of the invention will now be described in detail.

In FIG. 1 there is shown, in considerably exaggerated dimensions a fragment of a light polarizing sheet material 10 as it would appear in elevation, namely, as viewed along a given edge. In order of arrangement with respect to the direction of a collimated beam 12 from a light source (not shown) the material is composed of an isotropic layer 14 having a positively or convergingly lenticulated surface 14a and a doubly-refracting or birefringent layer 16 having an optic axis 18, the two layers being bonded together at an interface 20 to form a unitary structure. It is not essential to operability to have the layers thus bonded. However, preferably the facing layer surfaces enclosing an air layer are in parallel relation, as may be provided by spacing means therefor. The optic axis 18 of birefringent layer 16 is disposed at a given angle relative to the plane of the composite device 10 as, for example, at 45° to the surfaces 16a and 20. The refractive index of the layer 14 and the refractive indices of the layer 16 are not critical. Merely by way of example, the layer 14 may be taken as having an index of approximately 1.5 or 1.7 and the layer 16 as having indices of 1.5 and 1.7, 1.7 and 1.9, or some other range thereof.

The surface 14a is composed of a plurality of elongated, generally-cylindrical lens-like or lenticular elements 14b which extend across the entire area of the material in a direction normal to the surface of the paper, that is, toward and away from the viewer. Each pair of lenticules is joined along a line 14c, the lines 14c being parallel to one another and, of course, extending in a direction similar to that of the lenticules themselves. The lenticules are of a size which depends upon optical considerations and may include as many as several hundred to the inch. Their chosen size, spherical or aspherical curvature, relative disposition, and positive or negative form are dependent upon factors relating to the required paths and focusing of light-ray components transmitted by the assembly.

A certain degree of latitude is possible as to the choice of materials employed in forming the layers 14 and 16. Thus, for example, the layer 14 may suitably be composed of an isotropic plastic material, for instance, a methacrylate such as cyclohexylmethacrylate having a refractive index of 1.52. The layer 16 may, appropriately, be composed of a plastic material as, for example, of polyethylene terephthalate which has been rendered birefringent. A readily obtainable material of this composition, having refractive indices of 1.52 and 1.78 where rendered birefringent is one having the trade-name "Mylar," sold by E. I. du Pont de Nemours Co., Wilmington, Del., U.S.A.

One method of constructing the polarizing device 10 is to preform the birefringent component 16 and the isotropic component 14 and bond the two together by softening the surfaces and pressing them together, by employing subcoats as advisable, or by using an adhesive substance, preferably having a refractive index approximating that of layer 14. Alternatively, layer 14 may be applied as a coating to layer 16 and the lenticulation 14a formed thereafter, as by an embossing or other forming process.

The birefringent layer 16 may be formed in any manner conducive to establishment of an optic axis 18 in the general direction shown. For example, a sheet of a given thickness of the aforementioned polyethylene terephthalate may, preferably in the presence of heat or other softening agent, be drawn between a pair of die surfaces which are moved to effect a differential frictional contact with top and bottom surfaces of the sheet. A second method of providing the desired orientation involves the passing of a semi-softened sheet of the material between a pair of differentially-rotating and frictionally-engaging pressure rolls. At hird forming process contemplates the stacking and bonding together of a plurality of sheets, each having an orientation or principal axis in the plane of the sheet but at 45° to an elongation direction thereof, and slicing the stacked sheets transversely in thin sections.

The collimated beams 12, emanating, for example, from a light source and reflector adapted to the purpose and normally incident upon the lenticulated isotropic layer 14, are convergently refracted. Uon entering the birefringent layer 16, at the interface 20, they are resolved into two components, namely, the extraordinary or "E" ray components 12a and the ordinary or "O" ray components 12b, the "E" and "O" components traveling in different directions, at relatively different speeds and having their vibration azimuths orthogonally disposed.

Both the "E" and the "O" components emerge from the device 10 as differentially polarized rays and are brought toward a focus adjacent to the exit face 16a. In the example shown, the "O" rays, having the lower index, are undeviated at the interface 20 and proceed in a straight line toward focus, whereas the "E" rays, having the higher index are so deviated as to converge toward a focus which is laterally displaced by a given amount. The foci of the "O" rays are centered on the lenticules 14b while those of the "E" rays are centered on the joining line 14C of the lenticules. With respect to the aforesaid displacement of foci, the relation of the thickness of the assembly, and more particularly that of the birefringent layer, to the lenticular repeat-distance, namely, the distance between vertices, is such that the displacement is one-half the repeat-distance. As described, the layer 16 is positively birefringent but this condition, while preferred, is not inflexible and a negatively birefringent layer may be employed.

Either the "E" or the "O" ray components, or both, may be selectively treated, as by passing them through retardation elements, to provide their vibration directions in a single azimuth. Thus, in the assembly 22 of FIG. 2, a plurality of elongated half-wave retardation strips 24 is shown as bonded to the exit face 16a so as to be predeterminedly spaced from, and extend in a direction parallel to the lenticulations 14b, the device otherwise being similar to the assembly 10 of FIG. 1. The retardation strips 24 are so positioned and spaced, laterally, that the "O" rays, whose focus is centered on the lenticules 14b, are intercepted thereby, while the deviated "E" rays, whose focus is centered on the joining lines 14c, bypass the retardation strips. Assuming the half-wave retardation strips to have a principal direction or axis disposed in the plane thereof and at 45° to their long dimension, the vibration direction of the "O" ray components is rotated by 90° to provide a uniformity of azimuth with that of the "E" ray components and the emergent rays are rendered uniformly polarized.

Wherein it is required to provide emergent, collimated, polarized rays, a modification of the device of FIG. 2, adapted to the purpose, is illustrated by the assembly 26 of FIG. 3. A lenticulated isotropic layer 28 is bonded to or formed on layer 16 as, for example, in the manner previously described with respect to the isotropic layer 14. While the assembly 26 is shown as including the retardation elements 24, it will be understood that the lenticular element 28 could, if preferred, be combined with the device 10 of FIG. 1. It is also to be understood that the lenticulated surface 28a could be formed directly on the layer 16, without the provision of a separate layer 28 for the purpose. As shown in FIG. 3, the emergent rays are both uniformly polarized and collimated, this constituting a preferred condition where such uses as headlamp glare elimination are visualized.

Consistent with obtaining an operational refraction or nonrefraction of rays generally similar to those illustrated, the several layers may be formed of substantially any materials having suitable isotropic, doubly-refracting, transparent or other optical, physical or mechanical properties such as thermal stability, flexibility, or rigidity, depending upon contemplated usage. Thus, for example, the isotropic layers 14 and 28 may be composed of any of such materials as tetrafluoroethylene, vinyl acetate, polyvinyl carbazole, a polystyrene, cellulose acetate butyrate, an acrylic, glass, etc. Layer 16, if of relatively small dimensions, could be a sodium nitrate crystal plate having indices of refraction of 1.587 and 1.336 or a calcite crystal plate having indices of 1.658 and 1.486. Additional materials which can conceivably be used in forming the birefringent layer 16 comprise cellulose acetate, ethyl cellulose, methyl cellulose, natural crystals of urea, or some other birefringent particles.

While collimation of the incident beams 12 is not essential to operativeness, this condition is generally or predominantly to be expected in an anti-glare headlamp system and non-collimated diverging entering beams would require a lateral repositioning of the half-wave retardation strips 24 or of any collimating means at the exit surface such as the lenticular means 28 to accommodate to focal points which would differ laterally from those shown. Thus, the lateral locations of foci and elements located thereat would depend upon whether they were adapted to function relative to collimated or diverging incident light. In the instance of a polarizer adapted to function with diverging incident rays, it may generally be assumed that the locations of elements at the focal points are along theoretical lines from the light source which pass through the centers of the lenticules at a first interface.

The size, radius of curvature and focal length of lenticules, are so chosen as to establish a focal plane adjacent to an exit face of each assembly. Where the lenticules have a large radius of curvature, it would be possible to reduce the overall thickness by making each in the form of a fresnel lens. In a further modification, the lenticules could, conceivably, be of other shapes such as of spherical or elliptical form, modification of the retardation elements being necessary, of course, to selectively intercept the rays. Wherein spaced retardation strips 24 have been shown, it would be possible to employ non-spaced, that is, successive quarter-wave retardation strips having, in sequence, relatively orthogonally disposed optic axes which, in turn were disposed at 45° to the long dimension of the strips.

Since certain changes may be made in the above product without departing from the scope of the invention herein involved, it is intended that all matter contained in the above description or shown in the accompanying drawing shall be interpreted as illustrative and not in a limiting sense.

What is claimed is:

1. A composite light polarizing device for receiving unpolarized incident light and transmitting a substantial proportion of said light in the form of polarized light through an exit surface therefor comprising:

focusing means for refracting a beam of said incident light toward a first plurality of spaced apart foci at said exit surface; and birefringent layer means having a planar entrance surface adjacent said focusing means and an optic axis disposed at an acute angle to said planar surface for transmitting one component of said light having a first polarization azimuth substantially without deviation, toward said first plurality of spaced apart foci and for laterally refracting another component of said light, having a second polarization azimuth orthogonal to said first polarization azimuth, toward a second plurality of spaced apart foci laterally spaced from said first foci, said birefringent layer having a selected thickness so that there is a predetermined spacing between said first and said second foci at said exit surface.

2. A composite light polarizing device, as defined in claim 1, wherein said focusing means is formed as a plurality of cylindrical lenticules.

3. A composite light polarizing device, as defined in claim 2, wherein the relation between the thickness of said birefringent layer means and the point-to-point spacing, between corresponding portions of adjacent lenticules, is such that the lateral displacement between said first and said second foci at said exit surface is one-half said spacing.

4. A composite light polarizing device as defined in claim 1 including retardation means positioned adjacent said exit surface for selectively rotating the polarization azimuth of at least one of said components so as to bring said polarization azimuths emerging from said exit surface to a common polarization azimuth.

5. A composite light polarizing device, as defined in claim 1, including means, positioned adjacent said exit surface for collimating light emerging from said exit surface.

6. A composite light polarizing device, as defined in claim 1, wherein said birefringent layer is composed of polyethylene terephthalate, so molecularly oriented as to provide said optic axis acute angle orientation.

7. A composite light polarizing device, as defined in claim 1, wherein said optic axis of said birefringent layer is disposed at an angle of approximately 45° relative to said planar entrance surface.

8. A composite light polarizing device for receiving unpolarized incident light and transmitting a substantial proportion of said light in the form of polarized light through an exit surface thereof comprising:

a first surface having cylindrical lenticules for refracting a beam of said incident light toward a first plurality of spaced apart foci at said exit surface;

birefringent layer means having a planar entrance surface adjacent said focusing means and an optic axis disposed at an angle of approximately 45° to said planar entrance surface for transmitting one component of said light, having a first polarization azimuth, substantially without deviation toward said first plurality of spaced apart foci and for laterally refracting another component of said light, having a second polarization azimuth orthogonal to said first polarization azimuth, toward a second plurality of spaced apart foci laterally spaced from said first foci, said birefringent layer means having a thickness related to the point-to-point spacing, between corresponding portions of adjacent lenticules, such that the lateral displacement between said first and said second foci at said exit surface is one-half said spacing;

retardation means positioned adjacent said exit surface for selectively rotating the polarization azimuth of at least one of said components so as to bring said polarization azimuths emerging from said exit surface to a common polarization azimuth; and means, positioned adjacent said retardation means, for collimating said light having said common polarization azimuth.

References Cited

UNITED STATES PATENTS

| | | | |
|---|---|---|---|
| 3,329,474 | 7/1967 | Harris et al. | 350—157 |
| 2,700,919 | 2/1955 | Boone | 350—157 |
| 2,180,114 | 11/1939 | Land | 350—157 |
| 2,270,535 | 1/1942 | Land et al. | 350—157 |
| 2,380,241 | 7/1945 | Jelley et al. | 350—157 |
| 2,420,279 | 5/1947 | Young | 350—157 |
| 3,060,808 | 10/1962 | Koester | 350—157 |
| 3,213,753 | 10/1965 | Rogers | 350—157 |
| 3,218,926 | 11/1965 | Boone | 350—158 X |
| 3,274,881 | 9/1966 | Sauer | 350—157 |

OTHER REFERENCES

Nelson, The Bell System Technical Journal, "Digital Light Deflection," vol. XLIII, No. 3, pp. 837–845, May 1964.

DAVID SCHONBERG, Primary Examiner

P. R. MILLER, Assistant Examiner

U.S. Cl. X.R.

350—147, 152, 167